March 8, 1949.  G. M. GRAHAM  2,464,034
CENTERING MECHANISM

Filed July 12, 1945  2 Sheets-Sheet 1

INVENTOR.
George M. Graham
BY
Parker & Burton
attorneys

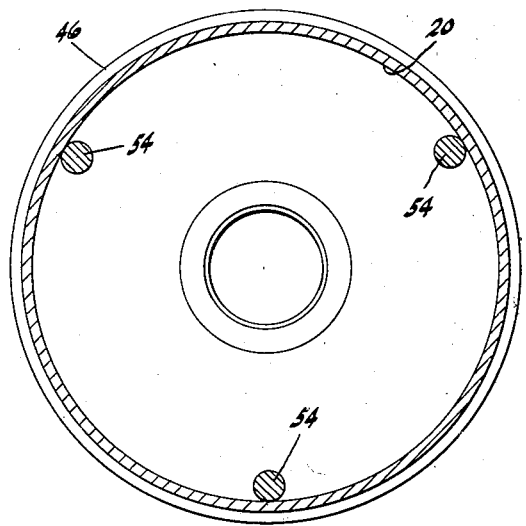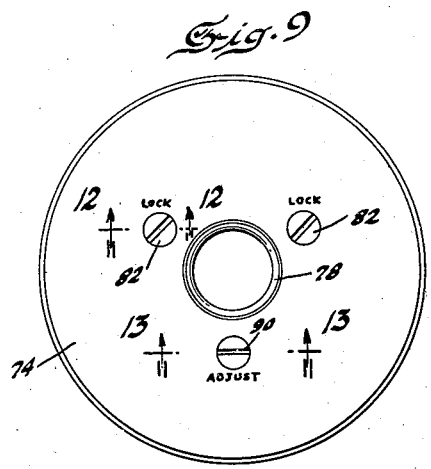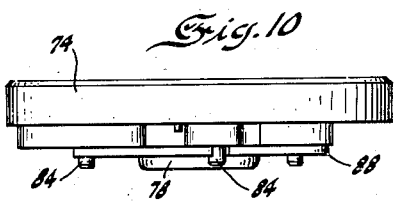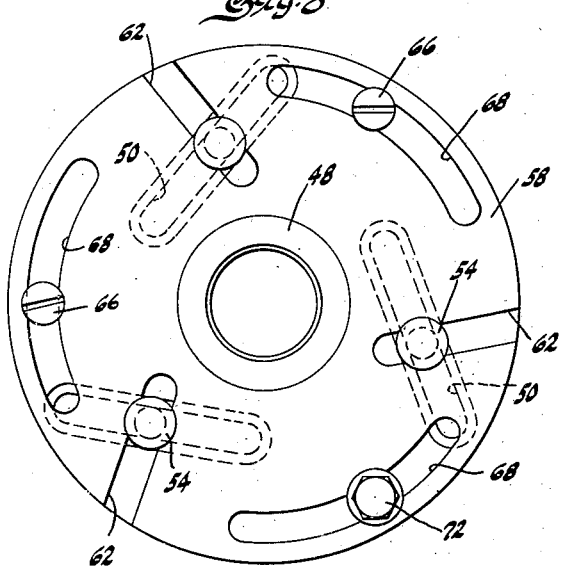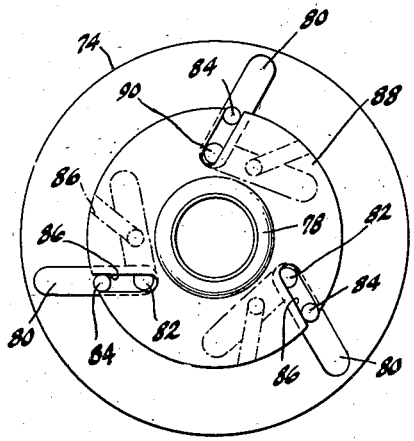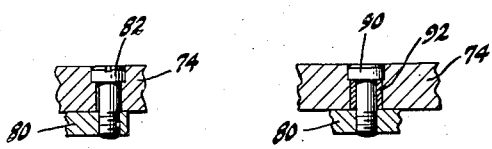

Patented Mar. 8, 1949

2,464,034

UNITED STATES PATENT OFFICE 2,464,034

CENTERING MECHANISM

George M. Graham, Detroit, Mich., assignor to Hinckley-Myers Division of Kent-Moore Organization Inc., Jackson, Mich., a corporation of Michigan Application July 12, 1945, Serial No. 604,640

3 Claims. (Cl. 29—283)

This invention relates to improvements in a tool adapted to be used to insert a sleeve liner into a bore or to remove the liner from the bore.

An object is to provide a tool of the character described which is provided with a thrust rod or member which is actuated to insert or withdraw the liner and which includes improved means for centering this thrust rod within the bore of the liner.

Another object is to provide centering mechanism coupled with the thrust rod of a tool of the character set forth which centering mechanism is of simple rigid construction and is quickly operable to permit insertion of the rod through the bore of the liner and to center the rod within the liner.

More specifically the centering means comprises a centering plate assembly which is slidably supported upon the thrust rod and is adapted to seat upon the upper end of the liner and which includes centering means proper receivable within the bore of the liner and readily adjustable to engage the surface of the bore to position the rod axially of the bore of the liner.

Another object is to provide centering means of the character set forth which is adaptable for use with liners of different size and which will permit use of a single tool with a wide range of liners.

Other objects, advantages and meritorious features will more fully appear from the following description, appended claims and accompanying drawings, wherein:

Figure 7 is a bottom horizontal plan of the structure shown in Figure 4 taken on the line 7—7 of Figure 4.

Figure 8 is a top plan view of the centering plate assembly shown in the first eight figures of the drawing and taken on the same line as Figure 3 and showing the centering plate assembly means contracted.

Figure 9 is a top plan view of a modified form of centering plate assembly taken on the same line as Figure 3.

Figure 10 is a side elevation of the construction shown in Figure 9.

Figure 11 is a bottom plan view of the construction shown in Figures 9 and 10.

Figure 12 is a fragmentary vertical section taken on the line 12—12 of Figure 9.

Figure 13 is a fragmentary vertical section taken on the line 13—13 of Figure 9.

Figure 1:
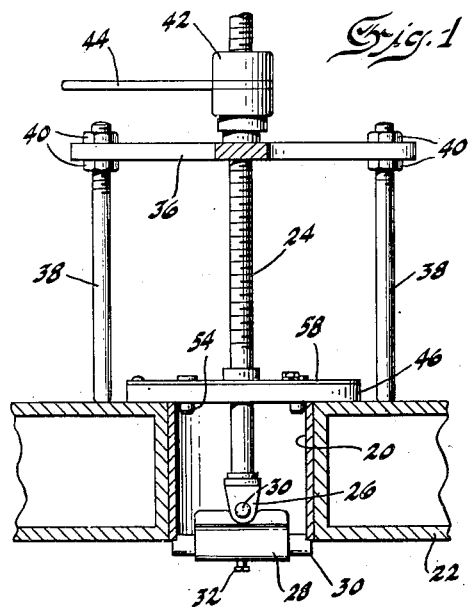
Figure 1 is a side elevation of a tool embodying the centering plate assembly of my invention illustrating the same in use to remove a sleeve liner which is shown in section.
Figure 2:
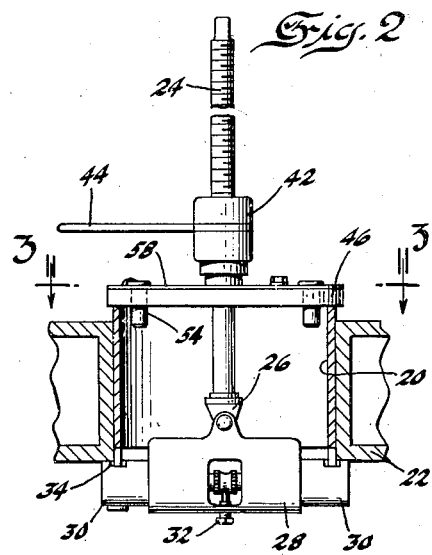
Figure 2 is a side elevation of a tool embodying the centering plate assembly of my invention illustrating the same in use to insert a sleeve line shown in section.

In the drawing this tool is shown in Figure 1 as being employed to withdraw a liner sleeve 20 from the bore of a block 22 and in Figure 2 it is shown as being employed to insert a liner sleeve 20 into the bore of such a block. A tool of this same general character is illustrated in my application Serial No. 569,138 filed December 21, 1944, and now Patent No. 2,421,324, granted May 27, 1947.

The tool comprises a puller thrust rod 24 having a fitting 26 secured to its lower end. A yoke 28 is pivoted at 30 to the fitting to be swung to a position perpendicularly thereto as shown in Figures 1 and 2 or to be swung to a position substantially parallel thereto. The yoke carries a pair of opposed arms 30 which are relatively adjustable radially of the rod 24 by means of suitable adjustment mechanism more particularly described in my application Serial No. 569,138. A screw 32 is shown as extending through a portion of the yoke and as having an end adapted to engage within a channel of a part associated with the arms 30 to maintain these two opposed arms centered in the yoke. These arm members 30 may be provided with a notch at each end adapted to engage the edge of the liner 20 as shown in Figure 1 or they may be cut out at each end as at 34 to provide clearance for downward projection of the liner as shown in Figure 2.

When a liner is to be withdrawn a supporting stand such as is illustrated in Figure 1 may be associated with the pull rod. This stand comprises a spider-like frame 36 provided with a plurality of radially projecting arms, three being here shown. A leg 38 is associated with each arm. Each arm may be radially slotted to permit the leg being moved in or out with respect to the rod 24. Each leg is provided with a pair of nuts 40 whereby it may be secured at adjusted position relative to the arm.

This stand is adapted to rest to be disposed upon the block superimposing the bore within which the liner is located and the spider frame element 36 is provided with a passageway through which the thrust rod 24 freely extends. A ratchet nut assembly 42 is threaded upon the rod as shown in Figures 1 and 2. This nut assembly is provided with an arm 44 whereby it may be rotated to advance or withdraw the rod to insert or withdraw a liner. Generally the above construction is illustrated and described in my co-pending application above identified. This particular invention relates to an improved centering assembly which is employed in conjunction with the rod and which is adapted to rest upon the upper end of the sleeve or liner as shown in Figures 1 and 2. This centering assembly is provided with means whereby it may be radially centered relative to the sleeve or liner to center the thrust member 24 therein and it is to this mechanism that the instant invention pertains.

The centering assembly is described herein as a centering plate assembly illustrated in Figures 1 through 8 and comprises a base plate 46 which is provided with an axial passageway through which the rod 24 may freely extend. Fixed within this axial passageway and constituting a bearing for the shaft 24 and a bearing for an adjustment plate hereinafter described is a hollow hub member 48. The base plate 46 is cut away providing a plurality of slots 50, three being here shown, which slots are spaced apart circumferentially and extend on an angle toward and away from the circumference of the base plate as here shown. The upper face of the base plate 46 is counterbored around each slot 50 as at 52.

Slidably disposed within each slot and extending therethrough is a pin 54. Each pin has a head flange 56 that seats within the counterbored portion 52 to support the pin within the slot while permitting free slidable movement through the slot. These pins extend below the bottom face of the base plate 46 and are adapted to be received within the interior of the sleeve 20 as shown in Figures 1 and 2. These pins are adapted to be adjusted through the slots 50 in and out with respect to the circumference of the base plate 46 to be brought into contact with the interior surface of the sleeve to center the base plate thereover.

Figure 3:
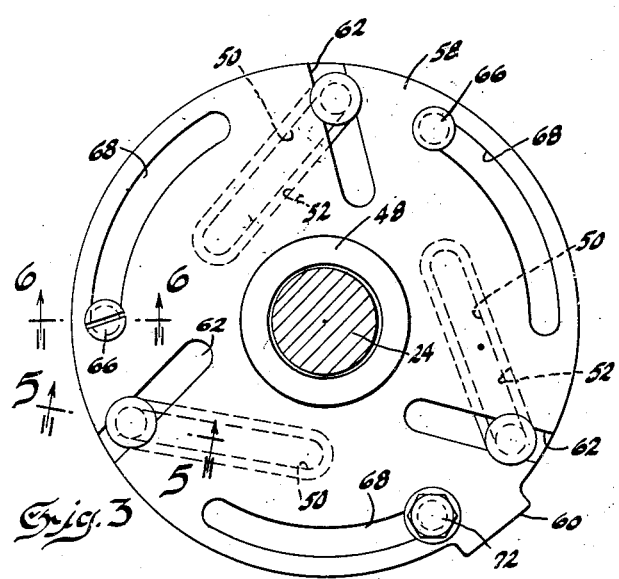
Figure 3 is a top plan view of a preferred form of a centering plate assembly embodying my invention taken on the line 3—3 of Figure 2 and showing the same at its maximum expansion.
Figure 5:
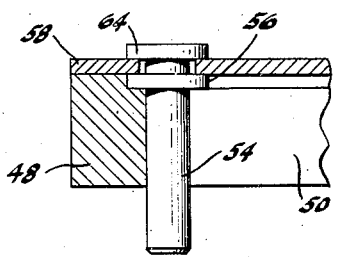
Figure 5 is a vertical sectional view taken on the line 5—5 of Figure 3.
Figure 6:
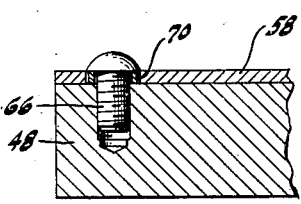
Figure 6 is a vertical sectional view taken on the line 6—6 of Figure 3.
Figure 4:
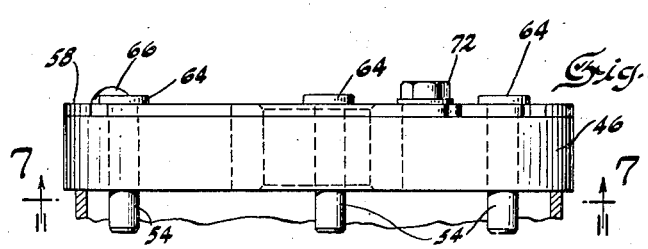
Figure 4 is a side elevation of the structure shown in Figure 3.

An adjustment plate 58 is supported upon the top of the base plate 46. This adjustment plate for rotation about the hub 48 is provided with a handle portion 60 which projects radially as shown in Figure 3 whereby the adjustment plate may be rotated about the hub 48 relative to the base plate 46. This adjustment plate is provided with a plurality of slots 62 shown in Figures 3 and 8. These slots 62 are spaced apart circumferentially about the adjustment plate as shown in Figures 3 and 8 and extend angularly with respect to the slots 50 in the base plate 46.

The pins 54 project upwardly through the slots 62. Each pin has a head flange 64 spaced from the head flange 56 so that the pin is held to the plate 58 to travel through a slot 62 as the plate 58 is rotated about the hub 48 over the base plate 46.

It will be seen that as the plate 58 is rotated about the hub 48 relative to the plate 46 the pins 54 will not only travel through the slots 62 but also be moved through the slots 50 either away from the circumference of the plate 46 or towards the circumference thereof, depending upon the direction of rotation of the plate 58.

To secure the plate 58 to the plate 46 to form a unitary assembly fastening screws 66 are provided. These screws are threaded into the plate 46 and extend through slots 68 in the plate 58. These slots 68 are arcuate and extend concentric to the axis of the plate 58. Each of the two screws 66 shown in the drawing has a head portion which overlaps the plate 58 but rests directly upon a washer 70 which washer is mounted within the slot 68 whereby the plate 58 is rotatable relative to the plate 46 but is held thereto by the screw 66.

In order to hold the plate 58 at any position of rotatable adjustment with respect to the plate 46 a screw pin 72 is shown which is threaded into the base plate 46 and extends through one of the slots 68 in the adjustment plate 58 and is adapted to tighten down directly upon the adjustment plate to hold it at any position to which it may be rotatably adjusted. When this screw pin 72 is loosened the plate 58 may be freely rotated relative to the base plate 46.

It will be seen that the centering plate assembly above described may be positioned upon a sleeve liner 20 as shown in Figures 1 and 2 and the adjustment plate may be rotated to bring the pins 54 into engagement with the inner surface of the liner and the screw 72 may then be tightened to lock the plate 58 in place to maintain such adjusted position. The adjustment plate 58 may first be rotated to swing the pins inwardly to a contracted position to facilitate insertion of the centering pins. In Figure 8 the pins are shown at an intermediate position which in Figure 3 the pins are shown at the position of maximum expansion.

In Figures 9 through 13 a slightly modified form of construction is illustrated. In this construction there is a base plate 74 which is provided with an axial opening wherein is fixed a hollow hub 78. A plurality of arms or levers 80, three being here shown, are pivoted at their inner ends by means of screw pins 82 to the plate 74 so that the levers may be swung outwardly towards the circumference of the plate 74 or inwardly away from the circumference. The pivots of these levers are circumferentially spaced with respect to each other.

Each lever is provided with a pin 84 which depends therefrom intermediate the ends of the lever. This pin extends through a slot 86 in an adjustment plate 88 which plate is rotatably supported upon the hub member 78 overlying the levers as shown in Figures 10 and 11. When the adjustment plate 88 is rotated the levers are swung in unison outwardly to the position shown in solid line in Figure 11 or inwardly to the position shown in dotted outline or any position in between.

One of the levers is provided with an adjustment screw 90 which has a sleeve 92 thereabout within the plate 74 so that upon rotation of the screw the lever coupled therewith is swung about its pivotal mounting of the screw within the plate 74. This screw 90 is employed with this one lever in lieu of the screw 82 heretofore referred to. Two of the levers are provided with screws 82. The third lever is provided with the screw 90. When the screw 90 is rotated it rotates the lever to which it is attached and through the coupling of all the levers with the adjustment plate 88 this plate is rotated and all the levers are actuated in unison to be swung in or out. The ends of the levers are adapted to contract the inner surface of the sleeve to center the centering plate thereover.

What I claim is:

1. A centering device comprising a shaft, and means to center the shaft including a plate axially slidably fitting the shaft, a plurality of circumferentially spaced apart centering members adjustably mounted in said plate and depending therebelow, means engageable with said members and operable to simultaneously shift the members radially of the plate equal distances from the axis of the shaft for centering engagement with an object to center said shaft, and means for simultaneously locking the members at any radially shifted position.

2. A centering device comprising, in combination, a rod, and means to center the rod including, a plate axially slidably fitting the rod, said plate being provided with a plurality of circumferentially spaced apart slots each extending toward and away from the axis of the rod, a pin slidably supported within each slot and depending below the plate, an adjustment plate supported upon the first plate for rotation about the axis of the rod, said adjustment plate provided with a plurality of slots angularly disposed with respect to the slots of the first plate within which said pins are engaged, said adjustment plate being operable upon rotation in one direction relative to the first plate to simultaneously move said pins outwardly through the slots in the first plate equal distances from the axis of the rod for centering engagement with an object to center said rod and into engagement with the inner periphery of the sleeve through which the rod extends, and means operable to releasably lock the two plates together to maintain the adjustment of the pins.

3. A centering device comprising, in combination, a rod, and means to center the rod including a plate axially slidably fitting the rod, a plurality of levers pivoted to the plate in circumferentially spaced apart relationship, an adjustment plate supported upon the first plate for rotation about the axis of the rod and provided with slots one for each lever, each lever having a part spaced from its pivotal connection which is so slidably received within a slot of the adjustment plate that upon rotation of the latter relative to the first plate the outer ends of the levers are swung equal distances radially toward or away from the axis of the rod for centering engagement with an object to center said rod, and means operable to releasably lock the two plates together to maintain said levers in any adjusted position.

GEORGE M. GRAHAM.

REFERENCES CITED

The following references are of record in the file of this patent:

UNITED STATES PATENTS

| Number | Name | Date |
| --- | --- | --- |
| 513,392 | Hall | Jan. 23, 1894 |
| 1,296,864 | Shearn | Mar. 11, 1919 |
| 1,385,452 | Hoffman | July 26, 1921 |
| 1,456,525 | West | May 29, 1923 |
| 1,630,197 | McKenzie | May 24, 1927 |
| 1,870,954 | Guenther et al. | Aug. 9, 1932 |
| 1,923,658 | Blakeslee | Aug. 22, 1933 |
| 1,951,986 | Malkomes | Mar. 20, 1934 |
| 1,980,138 | Johnson et al. | Nov. 6, 1934 |
| 1,990,570 | Smith | Feb. 12, 1935 |
| 2,031,998 | Bliss | Feb. 25, 1936 |
| 2,094,225 | Tuttle | Sept. 28, 1937 |
| 2,341,677 | Wass | Feb. 15, 1944 |
| 2,421,324 | Graham | May 27, 1947 |